May 17, 1949.  G. S. SCHAFFEL  2,470,651
POLYMERS OF CONDENSATION PRODUCT OF ARYL DIETHER
DICARBOXYLIC ACID AND DIHYDRIC ALCOHOL
Filed May 23, 1944

Fig. 1.

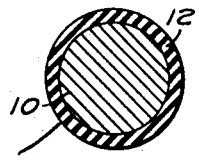

Insulating Coating
Comprising Thermoset
Resinous Condensation
Product of an Aryl Polyoxy
Polycarboxylic Acid and
a Polyhydric Alcohol.

Fig. 2.

Thermoset Resinous
Condensation Product
of an Aryl Polyoxy
Polycarboxylic Acid
and a Polyhydric Alcohol.

WITNESSES:
E.A.McCloskey
J.Shapot

INVENTOR
Gerson S. Schaffel.
BY
Brown, Critchlow & Flick
his ATTORNEYS

Patented May 17, 1949

2,470,651

UNITED STATES PATENT OFFICE 2,470,651

POLYMERS OF CONDENSATION PRODUCT OF ARYL DIETHER DICARBOXYLIC ACID AND DIHYDRIC ALCOHOL

Gerson S. Schaffel, Pittsburgh, Pa., assignor to Westinghouse Electric Corporation, East Pittsburgh, Pa., a corporation of Pennsylvania Application May 23, 1944, Serial No. 536,878

12 Claims. (Cl. 260—75)

This invention relates to new compositions of matter, more particularly to synthetic elastomers, and it encompasses articles coated or impregnated with as well as electrical insulation and insulated electrical conductors embodying those materials.

A primary object of the invention is to provide synthetic polymeric materials varying in properties from hard and brittle thermoplastic resins to materials that can be thermoset to provide products which possess elastomeric characteristics to a high degree.

A further object is to provide synthetic elastomers which are thermosetting, are solvent-resistant and temperature-resistant, and which vary from hard and tough materials to materials which are soft, rubbery, resilient and flexible.

Still another object is to provide synthetic elastomers which possess electrical insulating properties combined with the ability to be thermoset to a form in which they are resilient, flexible and resistant to temperature and solvents, and which can be produced easily.

Yet another object is to provide liquid coating compositions suited to the production of thermoset polymeric resin coatings, particularly coatings adapted for electrical insulation.

Still another object is to provide electrical insulation which combines good electrical insulating properties with resistance to temperature and solvents, and is resilient and flexible.

A further object is to provide electrical conductors insulated with material comprising thermoset synthetic resin which is flexible and resilient.

Other objects will appear hereinafter.

The invention will be described with reference to the accompanying drawings in which Fig. 1 is a cross sectional view through an electrical conductor insulated in accordance with the invention; and Fig. 2 a cross sectional view through an insulating tape in conformity with the invention.

In accordance with the invention an aryl polyoxy polycarboxylic acid is condensed with a polyhydric alcohol to produce polymeric products. If the condensation is effected without the aid of a catalyst brittle and hard linear polymers result which are of relatively low softening point, permanently thermoplastic, and soluble in organic solvents, even if the polymers are of high molecular weight, for which reason such resins are of limited applicability. In the preferred practice the reaction between the acid and the alcohol is performed in the presence of a condensation catalyst, which causes cross linkages to be developed; the resultant products are thermosetting, temperature resistant, solvent resistant, and vary from hard and tough resins to soft rubber-like elastomers, depending upon the initial constituents and reaction conditions. Various acids of the class named, i. e., aryl polyoxy polycarboxylic acids, can be used in the practice of the invention. These acids may be represented by the formula

$$A(\text{—O—}R_1COOH)_n$$

where A is an aryl radical, and $R_1COOH$ is an acidic group, attached by the ether linkages, —O—, to the aryl radical A, in which $R_1$ is an alkyl group, and $n$ is an integer of from 2 to 5. The aryl base A with ether linkages can, for example, be derived from a variety of polyhydric phenols, examples being hydroquinone, resorcinol, catechol, phloroglucinol, pyrogallol, the tetra and pentahydroxy benzenes, and the various hydroxy naphthols containing at least two hydroxyl groups. Variations in the properties of the condensation products of this invention are to be had not only by appropriate selection of the aryl base but likewise by forming the polyether polycarboxylic acid from other types of polyhydric phenols such, for example, the halogenated polyhydric aryls, polyhydroxy anilines or aromatic amines, and alkyl substituted polyhydric phenols and naphthols.

Aliphatic acids are used to provide the carboxylic group ($R_1COOH$) of these polyoxy polycarboxylic aryls. Acetic acid is characteristic but many other aliphatic acids may be used, examples being propionic and butyric acids. Other aliphatic acids, both saturated and unsaturated, are applicable also. Generally speaking, an increase in the length of the carbon chain $R_1$ tends to give final condensation products of increasing softness and rubberiness.

As will be evident, a great variety of these polyoxy polycarboxylic aryls may be prepared for the purposes of the invention. Typical of those made from the fatty acids are resorcinol-O, O-diacetic acid, resorcinol-O, O-dipropionic acid, catechol-O, O-dibutyric acid, and phloroglucinol-O, —O—, O-triacetic acid.

These polyoxy polycarboxylic aryls can be produced in various ways, but in reacting the polyhydroxy aryl to introduce the group —$R_1COOH$ it is preferred to use the halo-derivatives of the aliphatic acids, particularly the omega monohalo-carboxylic acids. For example, monochloracetic acid, beta bromopropionic acid and gamma chlorobutyric acid have been used with success. A typical procedure is to react, with heat and agitation, 1 mol of dihydric phenol, such as resorcinol, with 2 mols of the monochlor derivative of the acid, for example, monochloracetic acid, in aqueous solution using a strong base, such as potassium or sodium hydroxide, as a catalyst. This produces the sodium salt of the aryl polyoxy polycarboxylic acid, and the free acid can be recovered by acidification with a mineral acid.

The polyoxy polycarboxylic aryls are further reacted with polyhydric alcohols in order to produce a resinous product. Aliphatic polyhydric alcohols, such as ethylene glycol, propylene glycol, trimethylene glycol, triethylene glycol, diethylene glycol, and glycerol may be used, and also aromatic polyhydric alcohols, such as para-hydroxymethylbenzyl alcohol, may be used.

Condensation between the aryl polyoxy carboxylic acid and the polyhydric alcohol can be effected easily. Preferably the two reactants are mixed, a catalyst is added, and the mixture is then heated at a temperature such and under such conditions as to distill off and continuously remove water as it is formed by the condensation reaction. Most suitably the reaction is carried out at a temperature of at least 100° C. but not over about 200° C. The two reactants are used in proportions such as to react each of the hydroxy groups of the polyhydric alcohol with a carboxyl group of the acid. The condensation is carried to a point where the product is syrupy but is still soluble in volatile solvents such, for example, as ketonic solvents, e. g., acetone and diacetone alcohol, or the nitroparaffins.

This condensation in the presence of a catalyst results, as stated above, in polymers consisting of cross-linked chains. As a general rule the greater the proportion of catalyst present the more extensive will be the cross linking and the harder and more brittle the resin will be after it has been thermoset. Any of the wide variety of well-known condensing agents can be used for this purpose such, for example, as zinc chloride, sulfuric acid, aluminum chloride, antimony fluoride or chloride, and boron trifluoride.

During the condensation the water is, as noted, driven from the reaction body and removed from the system. After condensation has been carried to the proper point the product is treated to remove any residual water, unreacted constituent and lower, or oily, polymers, suitably by maintaining it under vacuum.

The polymers thus produced may be used in various ways but for the production of coating compositions they are taken up in a volatile solvent. The compositions are applied to articles to be coated, the solvent is evaporated, and the articles are then baked to effect thermosetting of the coating. This may be accomplished by heating at about 100° C., but higher temperatures, say up to 200° C., can, of course, be used. Still higher temperatures can be used provided the time is regulated so that the coating material is not depolymerized or otherwise affected adversely.

Coatings of the resin produced in this manner possess particularly desirable combinations of properties, especially when applied to cloth, paper, and the like for use as electrical insulating tapes, as cable cloth, and the like. The resin may be used also as an enamel for insulating wire, for impregnating armature coils, and for similar electrical insulating purposes, their electrical properties being satisfactory for these purposes. They possess the elasticity that is particularly necessary in wire enamels, insulating tape, and the like, and experience has shown that this elasticity is not lost after prolonged exposure to elevated temperatures. This heat resistance characteristic is highly desirable. Moreover, they are resistant to aromatic hydrocarbon solvents and to oil, which is rather unusual in rubber-like elastomers. In elongation, flexible life, dielectric strength, power factor and solvent resistance, the products of this invention, such as electrical tape, are distinctly superior to varnished tape made with the standard varnishes as at present generally available commercially.

Thin coatings produced in this way are of brown color. The products can likewise be produced in the form of sheets, which are black in color.

As an example of the practice of the invention, 400 parts by weight of resorcinol-O, O-diacetic acid are mixed with 400 parts by weight of ethylene glycol and 4 parts by weight of concentrated sulfuric acid. The mixture is heated to 175° C., which converts it to a clear solution, in a container equipped for removal of water as rapidly as it is distilled from the liquid, and heating is continued for 1 hour. At the end of that time the container is subjected to reduced pressure while keeping it at a temperature to remove further water, excess glycol, and lower polymers. This vacuum treatment is continued for 90 minutes, during which time the resin becomes very viscous. A suitable solvent, such as nitromethane, is then introduced in an amount to form a solution of the desired viscosity and solids content.

As another example, 54 parts by weight of hydroquinone-O, O-diacetic acid and 50 parts by weight of ethylene glycol are mixed with 4 parts by weight of concentrated sulfuric acid, and the mixture is heated to 150° C. for two hours while distilling off and removing the water which is formed. The container is then subjected to vacuum treatment for another hour followed by the addition of a solvent to form a liquid coating composition.

As a further example of the preparation of the resins of this invention, 250 parts by weight of resorcinol-O, O-dipropionic acid and 250 parts by weight of propylene glycol are mixed with 5 parts by weight of zinc chloride. The mixture is heated at 175° C. for two hours during which time water of condensation is removed by distillation. Heating is then continued for one hour while subjecting the container to reduced pressure, to remove water. A solution is then formed by adding 400 parts of acetone to the reaction product.

The solutions may be modified to provide predetermined properties by adding thereto finely divided organic or inorganic materials such, for example, as wood flour, silica, powdered asbestos, finely divided mica or vermiculite, powdered glass, and the like.

These solutions may be used as wire enamels or for the coating or impregnation of woven or felted fabrics of fibrous organic materials, for example, cotton or linen, or inorganic fibrous materials, such as asbestos or glass fibers in the form of cloth or mat, to produce, for instance, insulating tape. Or they may be used to bond such materials as flake mica. Thus, the fabric may be sprayed, dipped, passed between coating rollers, or coated or impregnated in other ways with the coating solution. The solvent is evaporated, suitably by heating gently or with a current of warmed air, after which the coated article is baked to thermoset the resin, for instance at about 100° to 150° C. for periods of time varying from 15 minutes to 2 hours. In the case of making laminated members it is preferable to effect the baking, or curing, under pressure.

The resinous coatings produced from the products of the foregoing examples are rubbery, flexible, tough, resistant to heat and solvents, and have good insulating properties.

The drawings represent the application of the invention to electrical insulation. Fig. 1 shows an electric conductor 10, such as a copper wire, enameled with a thermoset resin 12 such, for examples, as that of any of the foregoing specific examples. Fig. 2 shows an insulating tape 14 produced by impregnating a suitable fabric with such a resin.

From what has been said it will be understood that the prefix "poly" as used herein has reference to the di- and high compounds. It is to be understood also that the products described are not limited in utility to the electrical art but are useful for other purposes where advantage may be taken of the properties described. Thus, the flexibility of the cured products adapts them to the production of artificial leathers, and their adhesiveness to metal, flexibility and inertness to temperature and solvents adapts them for use in lining metallic containers and for allied purposes.

According to the provisions of the patent statutes, I have explained the principle and mode of practicing my invention and have illustrated and described what I now consider to represent its best embodiment. However, I desire to have it understood that, within the scope of the appended claims, the invention may be practiced otherwise than as specifically illustrated and described.

I claim:

1. A liquid coating composition comprising a volatile solvent having dissolved therein a thermosettable polyester derived by heating a dihydric alcohol having no reactive groups other than the hydroxyl groups and resorcinol-O, O-diacetic acid in the presence of a catalyst selected from the group consisting of zinc chloride, sulfuric acid, aluminum chloride, antimony fluoride, antimony chloride, and boron trifluoride until condensation therebetween and cross-linking of the condensation product has occurred, the proportions of said alcohol and acid being stoichiometrically equal.

2. Electrical insulation comprising fibrous material having a coating thereon of thermoset polyester derived by heating a dihydric alcohol having no reactive groups other than the hydroxyl groups and resorcinol-O, O-diacetic acid in the presence of a catalyst selected from the group consisting of zinc chloride, sulfuric acid, aluminum chloride, antimony fluoride, antimony chloride, and boron trifluoride until condensation therebetween and cross-linking of the condensation product has occurred, the proportions of said alcohol and acid being stoichiometrically equal.

3. A composition comprising thermosettable polyester derived by heating a dihydric alcohol having no reactive groups other than the hydroxyl groups and an aryl diether dicarboxylic acid in which aliphatic carboxyl groups are linked by the ether oxygen to the aryl nucleus and containing no reactive groups other than the carboxyl groups in the presence of a catalyst selected from the group consisting of zinc chloride, sulfuric acid, aluminum chloride, antimony fluoride, antimony chloride, and boron trifluoride until condensation between said alcohol and acid and cross-linking of the condensation product has occurred, the proportions of said alcohol and acid being stoichiometrically equal.

4. A composition according to claim 3, said alcohol being an aliphatic dihydric alcohol.

5. A composition according to claim 3, said acid being resorcinol-O, O-diacetic acid, and said alcohol is an aliphatic dihydric alcohol.

6. A liquid coating composition comprising a volatile solvent having dissolved therein a thermo-settable polyester derived by heating a dihydric alcohol having no reactive groups other than the hydroxyl groups and an aryl diether dicarboxylic acid in which aliphatic carboxyl groups are linked by the ether oxygen to the aryl nucleus and containing no reactive groups other than the carboxyl in the presence of a catalyst selected from the group consisting of zinc chloride, sulfuric acid, aluminum chloride, antimony fluoride, antimony chloride, and boron trifluoride until condensation between said alcohol and acid and cross-linking of the condensation product has occurred, the proportions of said alcohol and acid being stoichiometrically equal.

7. An article of manufacture comprising a base member having a coating thereon comprising thermoset polyester derived by heating a dihydric alcohol having no reactive groups other than the hydroxyl groups and an aryl diether dicarboxylic acid in which aliphatic carboxyl groups are linked by the ether oxygen to the aryl nucleus containing no reactive groups other than the carboxyl groups in the presence of a catalyst selected from the group consisting of zinc chloride, sulfuric acid, aluminum chloride, antimony fluoride, antimony chloride, and boron trifluoride until condensation between said alcohol and acid and cross-linking of the condensation product has occurred, the proportions of said alcohol and acid being stoichiometrically equal.

8. An insulated electric conductor comprising an electric conductor having a coating thereon comprising thermoset polyester derived by heating a dihydric alcohol having no reactive groups other than the hydroxyl groups and an aryl diether dicarboxylic acid in which aliphatic carboxyl groups are linked by the ether oxygen to the aryl nucleus and containing no reactive groups other than the carboxyl groups in the presence of a catalyst selected from the group consisting of zinc chloride, sulfuric acid, aluminum chloride, antimony fluoride, antimony chloride, and boron trifluoride until condensation between said alcohol and acid and cross-linking of the condensation product has occurred, the proportions of said alcohol and acid being stoichiometrically equal.

9. That method of making thermosettable cross-linked synthetic polymers which comprises heating a mixture of a dihydric alcohol having no reactive groups other than the hydroxyl groups, an aryl diether dicarboxylic acid in which aliphatic carboxyl groups are linked by the ether oxygen to the aryl nucleus and containing no reactive groups other than the carboxyl groups, and a catalyst selected from the group consisting of zinc chloride, sulfuric acid, aluminum chloride, antimony fluoride, antimony chloride, and boron trifluoride and continuing to heat until condensation between said alcohol and acid and cross-linking of the condensation product has occurred, the proportions of said alcohol and acid in said mixeure being stoichiometrically equal.

10. A method according to claim 9 in which water formed by the condensation is removed as it is formed, the reaction is terminated while the polymer product remains soluble, and unreacted alcohol and lower polymers are then distilled from the reaction mixture.

11. A method according to claim 9 in which the mixture is heated between about 100° and 200° C.

12. A method according to claim 9 in which said alcohol is an aliphatic dihydric alcohol.

GERSON S. SCHAFFEL.

REFERENCES CITED

The following references are of record in the file of this patent:

UNITED STATES PATENTS

| Number | Name | Date |
|---|---|---|
| 2,191,556 | Carothers | Feb. 27, 1940 |
| 2,282,827 | Rothrock | May 12, 1942 |
| 2,333,639 | Christ et al. | Nov. 9, 1943 |
| 2,364,204 | Fuller | Dec. 5, 1944 |
| 2,416,282 | Biggs | Feb. 25, 1947 |